United States Patent [19]
Friedman et al.

[11] Patent Number: 5,577,176
[45] Date of Patent: Nov. 19, 1996

[54] METHOD AND APPARATUS FOR DISPLAYING A CURSOR ALONG A TWO DIMENSIONAL REPRESENTATION OF A COMPUTER GENERATED THREE DIMENSIONAL SURFACE

[75] Inventors: Timothy Friedman, Lexington; Elena Gersht, Brookline; Constantin Sevici, Chelmsford, all of Mass.

[73] Assignee: Computervision Corporation, Bedford, Mass.

[21] Appl. No.: 321,202

[22] Filed: Nov. 23, 1994

[51] Int. Cl.$^6$ ............................................. G06T 3/60
[52] U.S. Cl. ............................................. 395/127; 395/129
[58] Field of Search ............................. 395/127, 118, 395/129, 125; 345/163, 157

[56] References Cited

U.S. PATENT DOCUMENTS

| | | | |
|---|---|---|---|
| 4,835,528 | 5/1989 | Flinchbaugh | 345/157 |
| 5,019,809 | 5/1991 | Chen | 345/157 |
| 5,422,987 | 6/1995 | Yamada | 395/127 X |
| 5,446,833 | 8/1995 | Miller et al. | 395/125 |
| 5,471,571 | 11/1995 | Smith et al. | 395/137 |

FOREIGN PATENT DOCUMENTS

0559374A1  2/1993  European Pat. Off. .

OTHER PUBLICATIONS

Portraying a Three Dimensional Cursor, IBM Technical Disclosure Bulletin, Jul. 1992, pp. 252–254.

*Primary Examiner*—Heather R. Herndon
*Assistant Examiner*—Cliff N. Vo
*Attorney, Agent, or Firm*—Wolf, Greenfield & Sacks, P.C.

[57] ABSTRACT

A cursor is dynamically attached to a two-dimensional representation of a three-dimensional surface in a CAD system. The system maps input coordinates indicating an initial position and a final position of a cursor to coordinates of a u-v surface representation of a the three-dimensional surface. The u-v coordinates are then mapped to display coordinates. The option to display this cursor on the surface is made by entering a command and by selecting a surface. The cursor preferably includes vectors indicating the magnitude and direction of the slope, and the display includes a window for displaying the u-v representation of the surface. A user can pick points on the surface based on what is visually observed on the display without projecting the point to another surface.

51 Claims, 3 Drawing Sheets

METHOD AND APPARATUS FOR DISPLAYING A CURSOR ALONG A TWO DIMENSIONAL REPRESENTATION OF A COMPUTER GENERATED THREE DIMENSIONAL SURFACE

FIELD OF THE INVENTION

This invention relates to a method and apparatus for displaying a cursor on a two dimensional representation of a three dimensional computer generated surface.

BACKGROUND OF THE INVENTION

When a cursor on a display is moved by an input device, such as a keyboard or a mouse, the cursor moves along pixels on a display according to a mapping from the input device to the coordinate system of the display. For example, when a mouse is moved on a tablet from one position to another, a relative position in terms of a coordinate system of the tablet is determined by movement of a roller under the mouse relative to the tablet. This movement is mapped directly to pixel coordinates on the display. When the cursor is moved with keys on a keyboard or keypad, an arrow button directs the cursor to move by some number of pixels, typically along a row or column on the display.

In computer aided design (CAD) systems, a user builds models which are displayed on a video display terminal. Such models can include two dimensional representations of three dimensional surfaces. When a CAD user moves a mouse, the cursor moves along pixels of the display without regard to the model that is displayed. Consequently, the positioning and movement of the cursor does not provide the user with any substantive information about the model.

SUMMARY OF THE INVENTION

The present invention provides a method and apparatus for moving a cursor along a surface of a computer generated representation of a three dimensional model so that the cursor is dynamically attached to the displayed surface. Thus, when a user moves the cursor, it moves in accordance with the shape and contours of the model. In a preferred embodiment, a CAD system according to the present invention maps positions from an input device in an i-j input space (called a tablet space if a mouse is used) to display coordinates through a parametric surface definition representation, typically known as a u-v surface definition space. Input space coordinates are mapped to positions in the u-v space. A surface evaluator maps these u-v space coordinates to x-y-z cartesian coordinates, which, in turn, are projected onto an m-n display space.

By mapping through the u-v and x-y-z coordinate systems instead of mapping directly from the i-j input space to the m-n display space, a mouse movement causes the cursor to move along a surface contour in such a way that the cursor is dynamically attached to the displayed surface.

The i-j space coordinates and m-n space coordinates are discrete cartesian coordinates which correspond to relative positions on a tablet and pixels on a display, respectively. The u-v surface definition space is two dimensional by definition, but may be cartesian or may have other non-cartesian axes, such as one or two axes that represent angular movement.

In preferred embodiments, the cursor includes unit tangent vectors taken with respect to the u and v coordinates, and a unitized normal vector which is a cross product of the tangent vectors. From this information, a user can see changes in the direction of the tangent and normal vectors as the cursor moves. Alternatively, the vectors could be displayed so that the magnitude of each vector is the magnitude of the slope.

Another preferred feature of the present invention is that the u-v surface definition space is displayed in a window at the same time as a selected surface along which the cursor is moved. A second cursor is provided in the u-v surface display window and moves at the same time as the cursor in response to an input by the user. This display helps the user visualize the movement in the u-v space as well as the movement on the surface in the model.

The present invention allows a user to interactively examine the shape of the surface and to pick points on the surface, without having to project a point on the display to one of the surfaces of the model. Once a user has picked one or more points on the surface, the user can drag the points to modify the surface, draw curves on the surface, make measurements, or perform other useful functions.

The present invention is particularly useful where an aesthetic or design function is employed, such as automobile body design, because a user can trace an outline of the surface by moving the cursor, and can see how the slopes change as the cursor is moved along the surface.

BRIEF DESCRIPTION OF THE DRAWINGS

Other features and advantages will become apparent from the following detailed description and from the appended claims in which:

DETAILED DESCRIPTION

Figure 1:
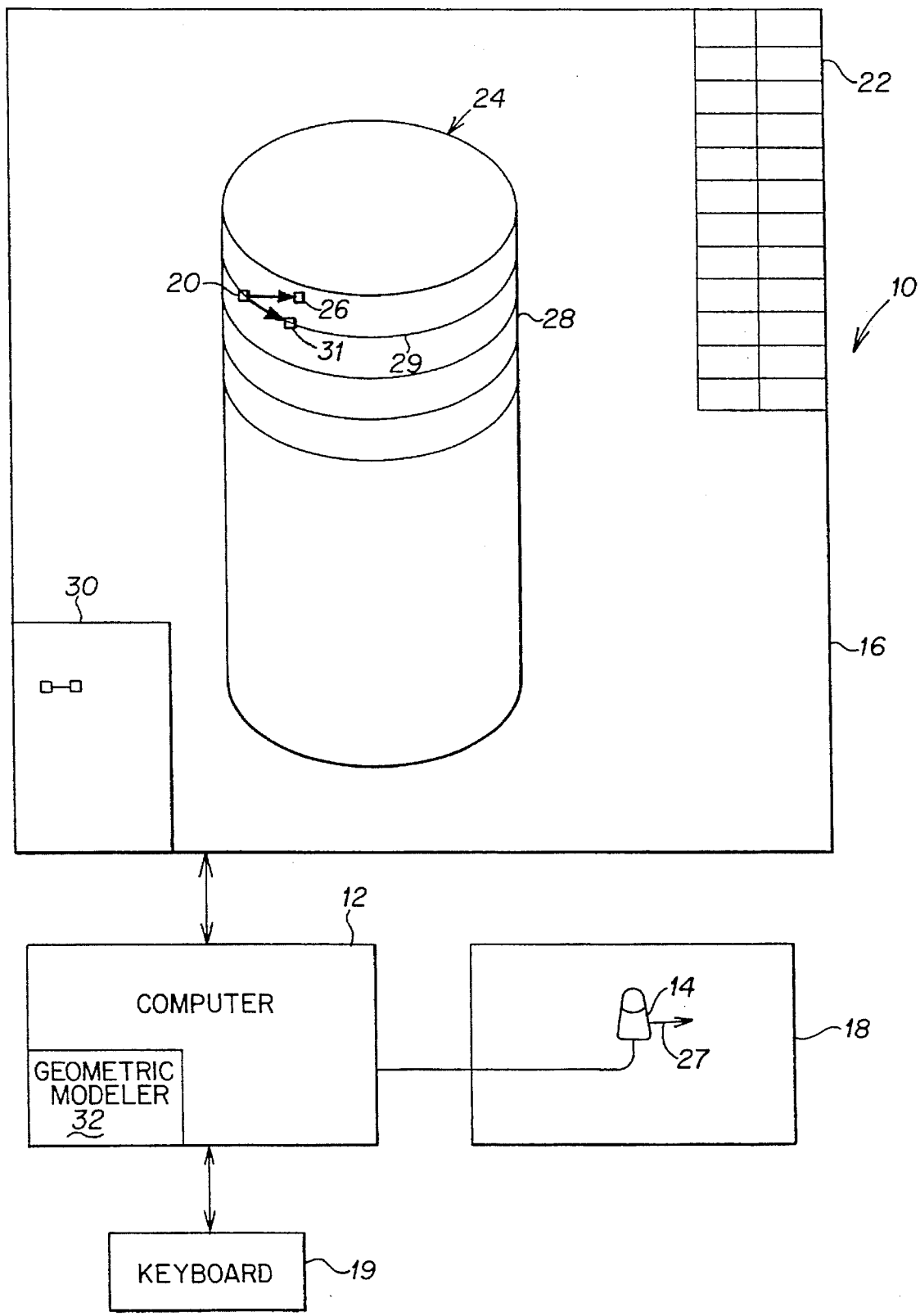
FIG. 1 is a block diagram of a CAD system.

Referring to FIG. 1, a computer aided design (CAD) system 10 is implemented on a typical workstation that includes a processing system shown generally as computer 12. The computer receives input signals from input devices, such as a mouse 14 and a keyboard 19, and displays information to a user on a display 16. The displayed information typically includes CAD models and a cursor for indicating a user-selected position on the display. The mouse rests on a tablet 18 and has a sensor (not shown) on the bottom. The relative motion of the sensor and the tablet causes signals to be provided to computer 12 to indicate how to move cursor 20 on the display.

Display 16 has a number of icons 22 for a user to conveniently select different routines or functions by clicking a button on the mouse. In CAD systems, such as the CADDS line of CAD systems produced by Computervision Corp. of Bedford, Mass., the use of icons simplifies the process of building models.

In the example of FIG. 1, a two-dimensional representation of a three-dimensional cylinder 24 is displayed. In the prior art, if a user moves mouse 14 directly to the right as indicated by arrow 27 (or if a key is pressed to move the cursor to the right), cursor 20 is moved to a corresponding position 26 directly to the right of the previous cursor position. According to the present invention, however, cursor 20 can instead move along a contour of the two dimensional representation. This feature is referred to as the surface cursor option.

To initiate the surface cursor option, the user selects the option by typing on keyboard 19 a token, such as NSUR-FACE, or by selecting an appropriate icon. A user then selects a surface, such as surface 28 which is the side of cylinder 24, along which the surface cursor option will be employed. The surface would typically be selected by clicking a mouse button while the cursor is positioned over the selected surface. When the user selects a surface, the computer opens on display 16 a window 30, in which a two dimensional u-v surface definition space for the selected surface 28 is displayed.

After a user selects the surface cursor option and surface 28 is selected, by moving mouse 14 a short distance to the right, the cursor moves along a contour 29 of the annular surface of the cylinder to position 27, rather than directly to the right to position 26. Thus, by moving the cursor in a straight line, the cursor may move along an arc, depending on the shape of the surface.

Figure 2:
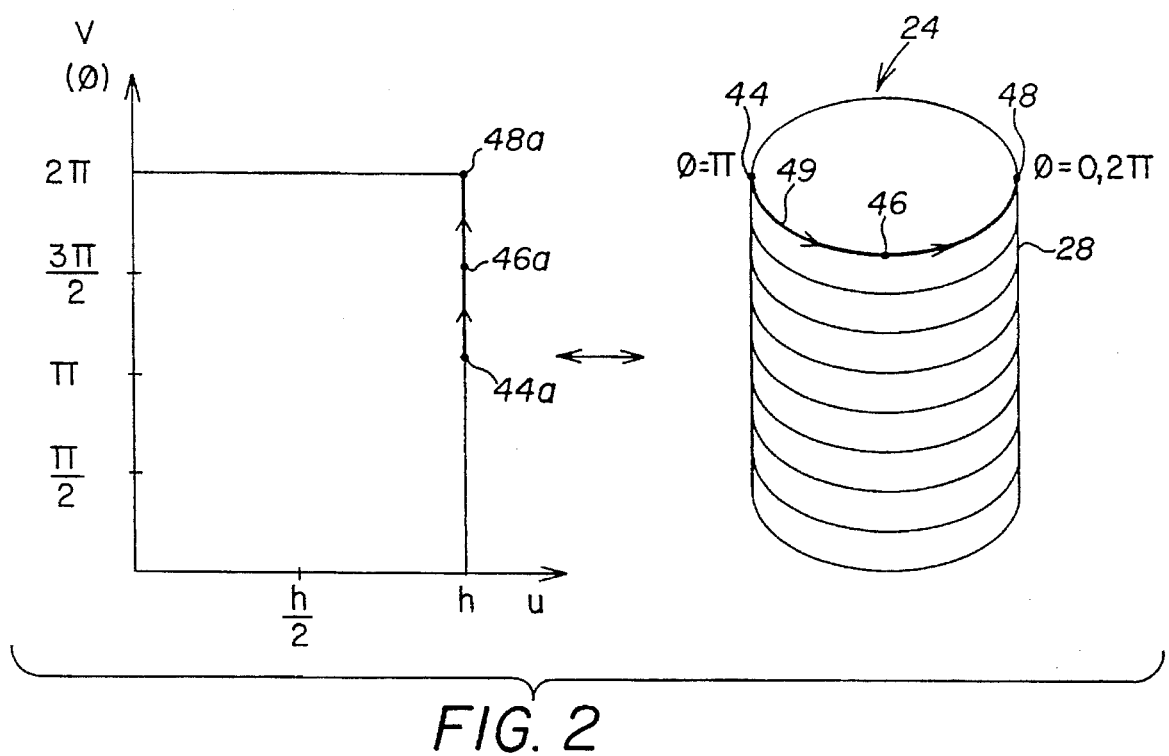
FIG. 2 is a graph of the cylinder shown in FIG. 1 in u-v space.

Referring also to FIG. 2, as is generally known in the field of CAD systems, a three dimensional surface is a two manifold entity that can be represented by a two dimensional u-v surface definition space. For example, surface 28 of the cylinder could be represented in two dimensions with the height of the cylinder and the angle of rotation. With two variables, a height and an angle of rotation, one can uniquely identify any desired point on surface 28. The u-v space can be cartesian in the case of a planar surface, can have two angles in the case of a partial sphere, or can take some other form as needed.

In known CAD systems, such as the CADDS line, a geometric modeler 32, which may reside as a combination of software and hardware in computer 12 (FIG. 1), receives input commands from the keyboard or mouse, such as "create cylinder", and converts these commands into surfaces, curves, and solids according to a set of rules which are defined in the geometric modeler. For example, if the user enters a command "create cylinder" (along with desired dimensional and positional information), the geometric modeler creates three surfaces: a planar top surface, a planar bottom surface, and a cylindrical side surface (or two half-cylindrical side surfaces). The rules indicate that the top and bottom faces residing on the planar surfaces each share an edge with the curved side face. Each of these surfaces is defined by a u-v representation based on defined rules. As noted above, a u-v representation for the side surface is shown in FIG. 2, while the top or bottom surfaces of a cylinder could be represented with a cartesian coordinate system.

As is also known in CAD systems, the surface defined in the u-v space can be mapped to x-y-z cartesian coordinates which are projected onto two dimensional display 16 based on a set of defined rules for displaying two dimensional representations of three dimensional objects.

Figure 3:
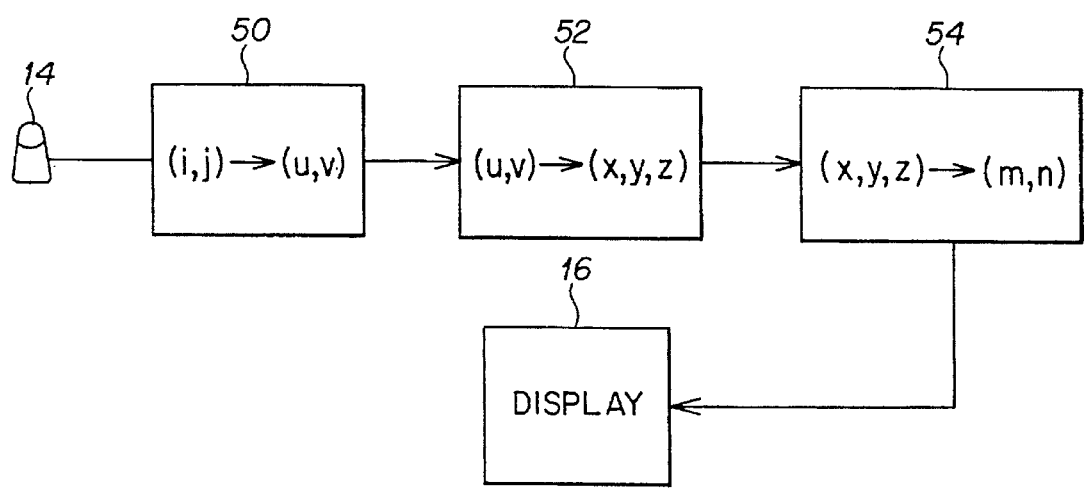
FIG. 3 is a block diagram of the mapping functions according to the present invention.

Referring to FIG. 3, according to the present invention, the cursor is dynamically attached to the two dimensional representation of the three dimensional surface on the display. To accomplish this, the surface cursor option is preferably performed through a series of mappings. When a user moves mouse 14 in the i-j tablet space to produce input signals that represent input coordinates, these input coordinates are mapped by a mapper 50 to a u-v surface definition space that corresponds to the user-selected surface. The u-v space is also displayed simultaneously in window 30 (FIG. 1) with a corresponding cursor. Thus, each time the mouse is moved in the i-j tablet space, the corresponding u-v space coordinates are modified accordingly and the cursor in window 30 is adjusted. These modified u-v space coordinates are provided to a surface evaluator 52 which maps the u-v coordinates to an x-y-z space to be displayed. The x-y-z coordinates are, in turn, projected with mapper 54 to the m-n display space, and coordinates are represented by pixels on display 16. Each of these mapping functions can be performed with an appropriate combination of hardware and software.

Referring again to FIG. 2 for an example, a cursor is initially at position 44 and is moved through position 46 to position 48. This movement would be accomplished by moving the mouse directly to the right from an arbitrary initial position on the tablet to a final position which represents a relative movement. As the user moves the mouse horizontally to the right, the cursor in the u-v space window moves vertically from position 44a through position 46a to position 48a, while the cursor on the surface of the cylinder moves along an arc 49 corresponding to a surface contour. For each incremental movement of the cursor, the system updates the position of the cursor on the display by performing the mappings outlined above. Consequently, even though the mouse is moved in a straight line, the cursor travels along an arc which represents the contour of the surface.

Figure 4:
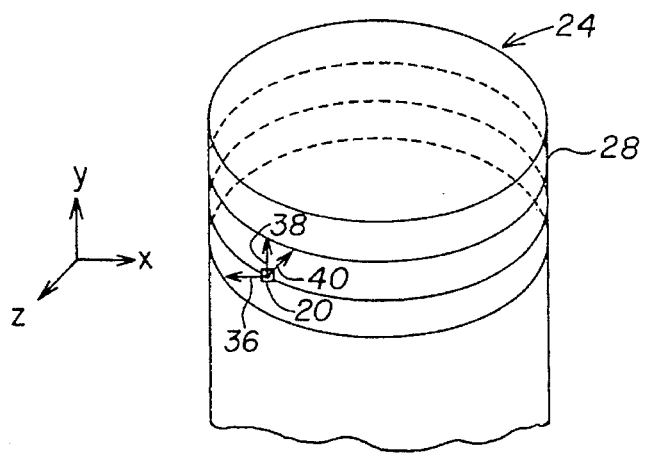
FIG. 4 is a representation of surface and a cursor according to the present invention.

Referring to FIG. 4, the cursor preferably has the shape of three vectors originating from a point of the surface: Ru 36 and Rv 38 to indicate the directions of surface derivatives with respect to the u and v coordinates, and a normal vector 40 which is a unitized vector of the cross product of Ru and Rv. By viewing these vectors a user can better sense surface contours of the model while moving the cursor over the surface. The CAD system according to the present invention also can store in memory a series of magnitudes as the cursor is moved along the surface.

According to the present invention, a user may move a cursor along a surface to get a sense for surface definition. Such a function is particularly useful when a CAD system is being used to design objects that have aesthetic purpose, such as an artistic piece, or a product design. The user can observe the surface tangents as shown in FIG. 2 to see the directions of the tangents and to determine variations in the tangents. Alternatively, the system could display the vectors so that their magnitudes corresponded to the magnitude of the tangents. In such a case, the system could provide indicates for zero or infinite slopes.

Figure 5:
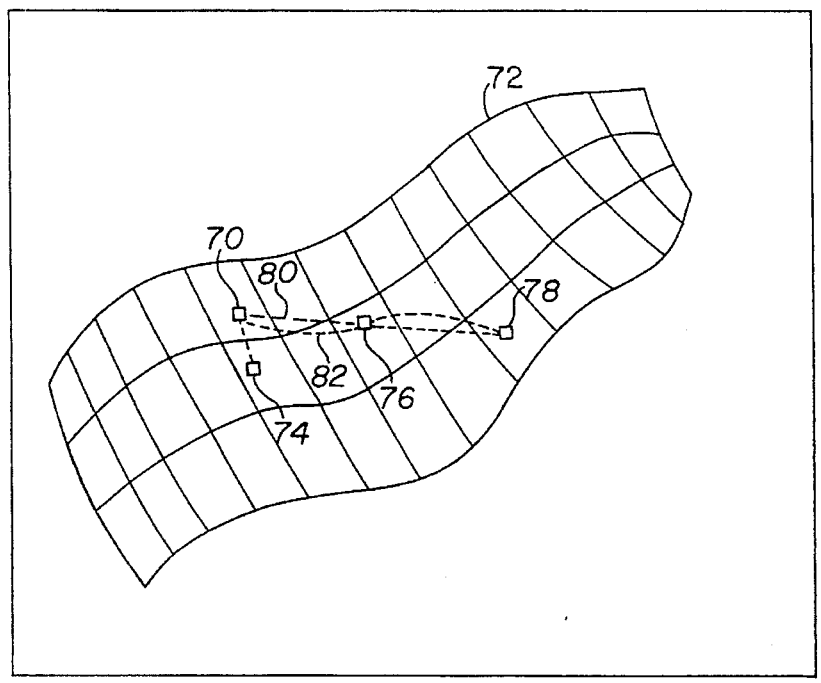
FIG. 5 is a representation of a surface and a cursor illustrating the ability to pick points.

Referring to FIG. 5, by clicking a designated button on the mouse, a user can select a point 70 on a surface 72 for further processing or analysis. Because of the dynamic attachment between the cursor and the selected surface, the user can select points as they are visually observed and each point is uniquely identified. A user can them employ a function which causes the selected point to be displayed on the screen; can select multiple points on the surface and connect them with the shortest curve along the surface; or can determine a distance along the contour or a distance from the selected points to a reference point or line.

Figure 6:
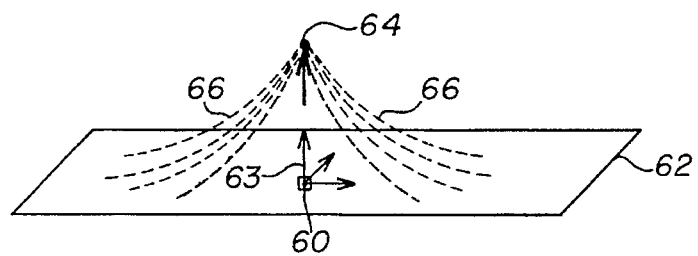
FIG. 6 is a representation of a surface illustrating the ability to drag a point.

By contrast, in some prior systems, by selecting a point on the screen, the selected point would be projected from the screen coordinates onto a surface in the model based on some rule, for example, by projecting the point perpendicular to a plane of the view to a point 74 on the nearest surface. Such systems, however, do not allow the user to predictably select any point on the surface based on the surface that is displayed and visually observed by the user. If multiple points 70, 76, and 78 are selected, the user can connect these points with the shortest possible line, where the line follows the contour of the surface, and not necessarily the cartesian display coordinates. Referring again to FIG. 2, for example, if a user were to select a point 44 and a point at position 46 and connect them by the shortest line, the line would be along arc 49, rather than a straight line on the display which would be the shortest distance between the two points in the cartesian coordinates of the display. In the example of FIG. 6, a prior system might connect points 70, 76, and 78 with dashed line 80, while the shortest route along the contour of the surface may be dashed line 82.

One can also perform other functions after desired points have been selected. For example, a user might want to find a midpoint between two points, such as points 70 and 78. In the discrete cartesian coordinates of the display, it may appear that the midpoint is point 76, but by taking the contour of the surface into consideration, the mid-point could be closer to point 78.

Referring to FIG. 6, another feature made possible by the surface cursor option is the ability to style the surface, e.g., by dragging a point. For this purpose, a user selects a point 60 on a surface 62 and indicates that it should be moved by a desired amount in some direction, e.g., in the direction of normal vector 63, to a new point 64. The system then uses an appropriate curve fitting techniques to fashion a new surface, represented by dotted lines 66, to conform to the new position of the dragged point. For example, a user could select convex or concave curve fitting.

Having described an embodiment of the present invention, it should be understood that other changes and modifications can be made without departing from the scope of the invention as defined by the appended claims. For example, the surface definition space is described as a u-v space, but this should be understood to include any representation of a surface through which input coordinates are mapped. Other input devices for controlling a cursor, such as a light pen, track ball, touch sensitive screen, track pad, or any other device for controlling the position of the cursor on the display, can be used.

What is claimed is:

1. A computer system comprising:

a display, having a set of display coordinates, that displays a cursor and a two dimensional representation of a surface of a three dimensional object;

a user-operable input device by which a user provides input signals that indicate a position of the cursor on the display in input coordinates;

a processing system, coupled to the display and to the input device, that receives the input signals indicating the cursor position and causes the cursor to be positioned on the display in response to the input signals, the processing system including:

a modeler for receiving input commands and for generating a surface definition representation of the surface of the three dimensional object in a surface definition space having a set of surface definition coordinates, means for mapping the input device coordinates of the cursor into surface definition coordinates that represent the position of the cursor in the surface definition space, and means for mapping the surface definition coordinates of the cursor and the surface definition representation of the surface into display coordinates that represent the surface and the position of the cursor on the display, so that the cursor is dynamically attached to the two dimensional representation of the surface of the three dimensional object.

2. The system of claim 1, wherein the processing system further includes means for simultaneously displaying, one the display, the surface definition representation of the surface, a second cursor and the two dimensional representation of the surface.

3. The system of claim 1, wherein the processing system further includes means for determining at least one tangent to the surface at a position of the cursor, and means for displaying a direction of the tangent.

4. The system of claim 3, wherein the processing system includes means for displaying the cursor as two vectors tangent to the surface and a vector normal to the surface.

5. The system of claim 1, wherein the processing system further includes means for receiving an input signal relating to a selected point on the two dimensional representation, and means for displaying the selected point, wherein the selected point is at a position on the surface that corresponds to a position visually observed on the display.

6. The system of claim 1, wherein the input device includes a device selected from the group consisting of a mouse, a keyboard, a keypad, a track ball, a track pad, a light pen, and a touch sensitive screen.

7. A method for use in a computer system including a display, having a set of display coordinates, for displaying a two dimensional representation of a three dimensional surface and a cursor, an input device for a user to move the cursor from an initial position to a final position, and a processor coupled to the input device and to the display, the method comprising the computer implemented steps of:

providing a two dimensional surface definition representation of the three dimensional surface in a surface definition space having a set of surface definition coordinates;

receiving signals from the input device indicating input coordinates corresponding to the initial position and the final position of the cursor;

mapping the input coordinates of the initial position and the input coordinates of the final position into surface definition coordinates that respectively represent the initial position and the final position in the surface definition space; and deriving display coordinates for the cursor from the mapped surface definition coordinates so that the cursor is moved on the display from the initial position to the final position along a path that represents a contour of the surface.

8. The method of claim 7, further comprising the step of determining a slope of a tangent on the three dimensional surface at a position of the cursor.

9. The method of claim 8, further comprising the step of displaying a window on the display for displaying the surface definition representation and a second cursor.

10. The method of claim 7, further comprising the steps of receiving input signals indicating a selected point on a surface, and displaying the selected point without projection.

11. The method of claim 7, further comprising the steps of receiving an input signal indicating a selected point on a displayed surface, providing a new point which is not on the surface, and deriving a new surface that includes the new point.

12. The method of claim 7, further comprising the steps of receiving input signals indicating a plurality of selected points, and indicating on the display each point that is selected without projecting, wherein each selected point is at a position on the surface which is the same as a position on the display.

13. The method of claim 12, further comprising the step of connecting the selected points with a line, wherein the line follows the displayed surface.

14. A computer system comprising:
  a first display window for displaying a first cursor and a first representation of a selected three dimensional surface, the first representation being two dimensional and having a three dimensional appearance;
  a second display window for displaying a second cursor and a second representation of the selected three dimensional surface, the second representation representing the selected three dimensional surface in a two dimensional surface definition space; and
  a processing system for receiving input signals from a user to indicate how to move the first cursor from an initial position to a final position, for deriving a first set of coordinates indicating the initial position and the final position for the first cursor in the first display window, and for mapping the first set of coordinates into a second set of coordinates in the surface definition space to determine coordinates for the second cursor so that the first and second cursors move simultaneously in the first and second display windows.

15. A method for operating a computer system having a display that displays a first cursor and a two-dimensional representation of a three-dimensional object, the three-dimensional object including at least one surface having a contour, the computer system including an input device that receives user commands to change a position of the first cursor on the display, the method including the computer implemented steps of:
  (A) receiving at least one command from the input device that represents a change in the position of the first cursor on the display from a first position to a second position, the first position on the display representing the at least one surface; and
  (B) moving the first cursor from the first position to the second position along a path that represents the contour of the at least one surface.

16. The method of claim 15, wherein step (B) includes a step of moving the first cursor such that the position of the first cursor represents the at least one surface at every position along the path.

17. The method of claim 16, wherein step (B) includes a step of, when the second position does not represent the at least one surface, moving the first cursor from the first position to a third position that represents the at least one surface, the third position representing a displayed portion of the at least one surface that is closest to the second position.

18. The method of claim 15, wherein the at least one surface is defined in a surface definition space having a set of surface definition coordinates, wherein the position of the first cursor on the display is represented by display coordinates, wherein the user commands represent changes in the display coordinates of the position of the first cursor, and wherein step (B) includes steps of:
  mapping the display coordinates of the position of the first cursor into surface definition coordinates representing the position of the first cursor; and
  mapping the changes in position of the first cursor into surface definition coordinates so that movement of the first cursor is accomplished in the surface definition space that defines the at least one surface.

19. The method of claim 18, wherein step (B) further includes a step of mapping the surface definition coordinates representing the position of the first cursor into display screen coordinates so that the position of the first cursor displayed on the display is represented in display screen coordinates.

20. The method of claim 19, wherein the three-dimensional object is defined in a three-dimensional object space having a set of three-dimensional object coordinates, and wherein the step of mapping the surface definition coordinates representing the position of the first cursor into display screen coordinates includes steps of:
  mapping the surface definition coordinates representing the position of the first cursor into three-dimensional object coordinates that represent the position of the cursor in the three-dimensional object space that defines the three-dimensional object; and
  mapping the three-dimensional object coordinates that represent the position of the first cursor into display screen coordinates.

21. The method of claim 15, wherein the at least one surface is defined in a surface definition space having a set of surface definition coordinates, and wherein the method further includes a step of displaying on the display a representation of the at least one surface in the surface definition space.

22. The method of claim 21, further including a step of displaying on the representation of the at least one surface in the surface definition space a second cursor representing the position of the first cursor mapped into the surface definition space.

23. The method of claim 15, wherein the at least one surface includes a plurality of surfaces, wherein the method further includes a step of receiving at least one command from the input device that selects one of the plurality of surfaces of the three-dimensional object represented by the two-dimensional representation displayed on the display, and wherein step (B) includes a step of moving the first cursor along a path that represents the contour of the selected one of the plurality of surfaces.

24. The method of claim 23, wherein the at least one surface is defined in a surface definition space having a set of surface definition coordinates, and wherein the method further includes a step of displaying on the display a representation of the selected one of the plurality of surfaces in the surface definition space.

25. The method of claim 24, including a step of displaying on the representation of the selected one of the plurality of surfaces in the surface definition space a second cursor representing the first cursor mapped into the surface definition space.

26. The method of claim 15, including a step of displaying the first cursor so that it includes a first vector normal to the contour of the at least one surface.

27. The method of claim 26, including a step of displaying the first cursor so that it includes a second vector representing a first slope of the contour of the at least one surface at the position of the first cursor and a third vector representing a second slope of the contour of the at least one surface at the position of the first cursor.

28. A method for operating a computer system having a display and an input device that receives user commands, the method including the computer implemented steps of:

(A) displaying on the display a first cursor and a two-dimensional representation of a three-dimensional object, the two-dimensional representation including at least one surface;

(B) receiving a first user command to select the at least one surface;

(C) receiving a second user command to select a position on the display; and (D) modifying the at least one surface so that the at least one surface passes through the selected position on the display.

29. The method of claim 28, wherein the at least one surface includes a plurality of surfaces, wherein step (B) includes a step of receiving a first user command to select a selected one of the plurality of surfaces, and wherein step (D) further includes a step of modifying the selected one of the plurality of surfaces so that the selected one of the plurality of surfaces passes through the selected position.

30. The method of claim 28, wherein the computer system includes a representation of the at least one surface in a surface definition space having a set of surface definition coordinates, wherein each position on the display has corresponding display coordinates, and wherein step (D) includes steps of:

mapping the display coordinates of each position on the display that represents the at least one surface into surface definition coordinates of the surface definition space;

mapping the display coordinates of the selected position into surface definition space coordinates of the surface definition space; and modifying the at least one surface in the surface definition space so that the at least one surface passes through the surface definition space coordinates of the selected position to generate at least one modified surface.

31. The method of claim 30, wherein step (D) further includes a step of mapping the surface definition coordinates of the at least one modified surface into display screen coordinates so that the at least one modified surface is displayed on the display.

32. The method of claim 31, wherein the three dimensional object is defined in a three-dimensional object space having a set of three-dimensional object coordinates, and wherein the step of mapping the surface definition coordinates of the at least one modified surface includes steps of:

mapping the surface definition coordinates of the at least one modified surface into three-dimensional object coordinates of the three-dimensional object space; and mapping the three-dimensional object coordinates of the at least one modified surface into display screen coordinates.

33. The method of claim 28, wherein the at least one surface is defined in a surface definition space having a set of surface definition coordinates, and wherein the method further includes a step of displaying on the display a representation of the at least one surface in the surface definition space.

34. The method of claim 33, wherein the first cursor has a position on the display, and wherein the method further includes a step of displaying on the representation of the at least one surface in the surface definition space a second cursor at a position representing the position of the first cursor mapped into the surface definition space.

35. A method for use in a computer system having a display that displays a first cursor and a two-dimensional representation of a three-dimensional object, the three-dimensional object including at least one surface having a contour, the computer system including an input device that receives user commands that each identifies a position on the display, the method including the computer implemented steps of:

(A) receiving at least two input commands from the input device that respectively identify at least two positions on the display, each of the at least two positions representing the at least one surface on the display; and (B) drawing between the at least two positions on the display a line that represents the contour of the at least one surface.

36. The method of claim 35, further including a step of displaying the line on the display such that the line represents a shortest path between the at least two positions along the contour of the at least one surface.

37. The method of claim 35, wherein the at least one surface is defined in a surface definition space having a set of surface definition coordinates, wherein each of the at least two positions has corresponding display coordinates, and wherein step (B) includes steps of mapping the display coordinates of the at least two positions into corresponding coordinates in the surface definition space, and drawing the line in the surface definition space.

38. The method of claim 37, wherein step (B) further includes a step of mapping surface definition coordinates representing each position along the line in the surface definition space into display screen coordinates so that the line is drawn on the display.

39. The method of claim 38, wherein the three-dimensional object is defined in a three-dimensional object space having a set of three-dimensional object coordinates and wherein the step of mapping the surface definition coordinates representing each position along the line into display screen coordinates includes steps of:

mapping the surface definition coordinates representing each position along the line into corresponding three-dimensional object coordinates in the three-dimensional object space; and mapping the three-dimensional object coordinates that represent each position along the line into display screen coordinates.

40. The method of claim 35, wherein the at least one surface is defined in a surface definition space having a set of surface definition coordinates, and wherein the method includes a step of displaying on the display a representation of the at least one surface in the surface definition space.

41. The method of claim 40, wherein the first cursor has a position on the display, and wherein the method further includes a step of displaying on the representation of the at least one surface a second cursor at a position that represents the position of the first cursor mapped into surface definition coordinates.

42. The method of claim 35, wherein the at least one surface includes a plurality of surfaces, wherein the method further includes a step of receiving at least one command from the input device that selects one of the plurality of surfaces of the three-dimensional object represented by the two-dimensional representation displayed on the display, and wherein step (B) includes a step of drawing the line to represent the contour of the selected one of the plurality of surfaces.

43. A method for use in a computer system having a display that displays a first cursor and a two-dimensional representation of a three-dimensional object, the three-dimensional object including at least one surface having a contour, the method including the computer implemented steps of:

(A) positioning the first cursor at a position that represents the at least one surface on the display;

(B) determining at least one slope of the contour of the at least one surface at the position of the cursor; and (C) displaying on the display at the position of the first cursor a representation of the at least one slope of the contour at the position of the cursor.

44. The method of claim 43, wherein the two-dimensional representation of the at least one surface is defined in a surface definition space having first and second coordinate axes, wherein step (B) includes a step of determining a first slope of the contour with respect to the first axis and a second slope of the contour with respect to the second axis, and wherein step (C) includes a step of displaying at the position of the first cursor a representation of the first and second slopes.

45. The method of claim 44, wherein step (C) includes a step of displaying the representation of the first and second slopes as first and second vectors having directions and magnitudes that respectively represent the first and second slopes.

46. The method of claim 45, wherein the method further includes a step of determining a cross product vector that is substantially equal to a cross product of the vector representation of the first slope and the vector representation of the second slope, and step (C) includes a step of displaying on the display at the position of the first cursor a representation of the cross product vector.

47. The method of claim 46, wherein the computer system includes an input device to receive user commands to change the position of the first cursor on the display, and wherein the method further includes steps of:

(D) receiving at least one command from the input device that represents a change in position of the first cursor on the display from a first position to a second position, the first position on the display representing the at least one surface;

(E) moving the first cursor on the display from the first position to the second position along a path that represents the contour of the at least one surface; and wherein step (B) includes a step of determining the first and second slopes of the contour at both the first and second positions, and step (C) includes a step of displaying vector representations of the first and second slopes at both the first and second positions.

48. The method of claim 43, wherein the at least one surface is defined in a surface definition space having a set of surface definition coordinates, and wherein the method includes a step of displaying on the display a representation of the at least one surface in the surface definition space.

49. The method of claim 48, including a step of displaying on the representation of the at least one surface in surface definition space a second cursor at a position that represents a position of the first cursor mapped into surface definition coordinates.

50. A method for use in a computer system having a display, the method including the steps of:

(A) displaying on the display a first two-dimensional representation of a three-dimensional object, the three-dimensional object including at least one surface; and (B) displaying on the display, while the first two-dimensional representation is displayed, a second representation of the at least one surface, the second representation representing the at least one surface in a two-dimensional surface definition space.

51. The method of claim 50, wherein step (A) includes a step of displaying on the display a first cursor at a position on the display that represents a position on the at least one surface, and step (B) includes a step of displaying on the display a second cursor at a position on the second representation that represents the position of the first cursor mapped into the surface definition space.

* * * * *